(12) United States Patent
Von Krosigk

(10) Patent No.: US 6,852,675 B2
(45) Date of Patent: Feb. 8, 2005

(54) NUTRIENT SOURCE FOR MARINE ORGANISMS FROM DRILLING FLUIDS ADDITIVES

(76) Inventor: James Richard Von Krosigk, 2625 Cowey Rd., Nixon, TX (US) 78140

(*) Notice: Subject to any disclaimer, the term of this patent is extended or adjusted under 35 U.S.C. 154(b) by 243 days.

(21) Appl. No.: 10/139,438

(22) Filed: May 3, 2002

(65) Prior Publication Data

US 2002/0169083 A1 Nov. 14, 2002

Related U.S. Application Data

(60) Provisional application No. 60/289,970, filed on May 10, 2001.

(51) Int. Cl.$^7$ ................................................ C09K 7/00
(52) U.S. Cl. ........................ 507/104; 175/66; 175/64; D1/101; 507/108; 507/113; 507/138; 507/140; 507/141; 507/145
(58) Field of Search .................. 507/104, 108, 507/113, 138, 140, 141, 145; 175/66, 64; 166/293; D1/101

(56) References Cited

U.S. PATENT DOCUMENTS

| | | | | |
|---|---|---|---|---|
| 4,176,720 A | * | 12/1979 | Wilson | 166/293 |
| 4,455,241 A | * | 6/1984 | Swanson | 507/211 |
| 4,720,303 A | * | 1/1988 | Soldatos | 106/181.1 |
| 5,096,883 A | | 3/1992 | Mercer et al. | 507/103 |
| 5,189,012 A | | 2/1993 | Patel et al. | 507/103 |
| 6,059,035 A | * | 5/2000 | Chatterji et al. | 166/293 |
| 6,152,227 A | * | 11/2000 | Lawson et al. | 166/293 |
| 6,602,181 B2 | * | 8/2003 | Quintero et al. | 588/250 |
| 6,668,947 B2 | * | 12/2003 | Cordova | 175/66 |
| 6,695,077 B2 | * | 2/2004 | Szymocha et al. | 175/66 |

* cited by examiner

Primary Examiner—Philip C. Tucker
(74) Attorney, Agent, or Firm—Wendy Buskop; Buskop Law Group, P.C.

(57) ABSTRACT

A nutrient source for marine organisms comprising: drilling fluids containing organic contaminants; a solidification agent; a cell transport agent; and a cellulosic additive.

24 Claims, No Drawings

NUTRIENT SOURCE FOR MARINE ORGANISMS FROM DRILLING FLUIDS ADDITIVES

The present invention claims priority to now abandoned Provisional Patent Application Ser. No. 60/289,970 filed in the U.S. Patent and Trademark Office on May 10, 2001.

BACKGROUND OF THE INVENTION

In the drilling of oil wells, gas wells, and the like, it is conventional practice to use a drilling fluid, such as a drilling mud to enhance the efficiency of the operation. When a drilling mud is used, it is continuously circulated from a storage area on the surface, downward through the drill pipe, and then upward through the borehole to the surface. The purpose of the mud is to remove drilled solids, such as cuttings and formation carvings, from the borehole to the surface. The fluid acts not only as a carrier, but also serves to cool and lubricate the drill bit, and to prevent pressure from being lost if a void or high-pressure gas pocket is encountered. Typically, drilling fluids for maritime drilling are more environmentally friendly than drilling fluids for land based use, but even so, most drilling fluids and muds contain a number of components, including barium, hematite, iron sulfite, and the like as weighting agents. Drilling muds and drilling fluids are typically mixed with oil to produce the final form of mud. In many areas of offshore drilling the oil component is known as synthetic oil. These synthetic oils exhibit minimal toxicity toward aquatic life and possess desirable Theological and filtration control properties for use in drilling fluids as compared to ordinary oil. The use of synthetic oils, particularly oleogomerized olefins, for drilling fluids has recently been patented these are referred to a synthetic oil based drilling muds or (SBM). For example, Mercer et al. in U.S. Pat. No. 5,096,883 discloses the use of compositions consisting essentially of branched paraffin having between 16 and 40 carbon atoms per molecule (such as the hydrogenated dimer of 1-decene) for this use. Also, Patel et al. in U.S. Pat. No. 5,189,012 discloses the use of compositions comprising branched chain oligomers.

Drilling muds are usually classified as either water-based muds or oil-based muds, depending upon the character of the continuous phase of the mud, although water-based muds may contain oil and oil-based muds may contain water. Water-based muds (WBM) conventionally comprise a hydratable clay, usually of the montmorillonite family, suspended in water with the aid of suitable surfactants, emulsifiers and other additives including salts, pH control agents and weighting agents such as barite. The water makes up the continuous phase of the mud and is usually present in an amount of at least 50 percent of the entire composition; oil may be present in minor amounts but will typically not exceed the amount of the water so that the mud will retain its character as a water-continuous phase material. Oil-based muds on the other hand, generally use a hydrocarbon oil as the main liquid component with other materials such as clays or colloidal asphalts added to provide the desired viscosity together with emulsifiers, gellants and other additives including weighting agents. Water may be present in greater or lesser amounts but will usually not be greater than 50 percent of the entire composition; if more than about 10 percent water is present, the mud is often referred to as an invert emulsion, i.e. a water-in-oil emulsion. In invert emulsion fluids, the amount of water is up to about 40 weight percent with the oil and the additives making up the remainder of the fluid.

Oil-based muds (OBM) were traditionally formulated with diesel oil or kerosene as the main oil component as these hydrocarbon fractions generally posses the requisite viscosity characteristics. They do, however, posses the disadvantage of being relatively toxic to marine life and the discharge of drilling muds containing these oils into marine waters is usually strictly controlled because of the serious effects which the oil components may have on marine organisms, particularly those which are commercially important for food. For this reason, offshore drilling rigs must return oil-based muds to shore after they have been used whereas water-based muds may generally be discharged into the ocean without any deleterious effects. The recycling of the OBM has become extensive and therefore in that respect an environmentally desirous outcome of the environmental movement. While the reuse of the OBM is environmentally friendly the use of diesel as the oil phase has a deleterious effect in that oil is left on the cuttings, which are discarded overboard.

OBM's may be made environmentally acceptable by the use of oils which posses low inherent toxicity to marine organisms and good biodegradability. These properties are associated in hydrocarbons with extremely low aromaticity. For these reasons, drilling fluids based on linear paraffins, olefins, alkanes and esters are considered desirable, and these are known as synthetic based muds (SBM). In recent years the environmental impact of overboard cuttings disposal both SBM and WBM has come under scrutiny by the regulatory environmental agencies.

One of the primary concerns is what is known as the mounding effect. This occurs when earthen cuttings, that are naturally and unavoidably generated during the drilling process, are deposited next to the drilling rig creating mounds or hills. These mounds are not simply objectionable they are environmentally damaging in themselves. As the organic components in the mounds begin to biodegrade they create a chemical oxygen demand (COD), which removes the locally available oxygen from the sea floor. This process consumes the available oxygen (less is available at lower depths); limits further biodegradation, limits sea life growth, and creates dead zones in deep ocean drilling locales. It is unknown how long it takes for surface oxygen to re-oxygenate the ocean floor but estimates from years to decades have been proposed. This problem has been investigated extensively in the North Sea drilling regions and approximately two million tons of cuttings have been located and are being considered for remediation due to this mounding effect.

Recent Environmental Protection Agency and Canadian National offshore Board Resource Board (CNORB) environmental impact studies have shown that the use of SBM's is superior to all other methods of drilling with the single environmental stressor of cuttings disposition. The EPA in its 2001 protocol went so far as to recommend the use of SBM's over WBM's due the recycling and reuse of SBM's. This protocol did lower the total acceptable amount of synthetic oil on cutting prior to overboard disposal but stated that the total environmental impact of using SBM's with overboard disposal was less than the total impact of transporting said cuttings to shore.

This invention addresses the further remediation of the cutting produced from use of SBM, WMB, and OBM. It will be utilized in conjunction with and after the solids control equipment that would already be on the drilling rig An object of the present invention is to provide an additive, which can be added to drilling fluids that have been used in the drilling process to make the organic contaminates found in SMB's, WBM's and OBM's available to indigenous marine life as a food.

Another object of the present invention is to provide and environmentally safe method for remediating drilling muds so that "mounding" does not occur on the sea floor near drilling rigs, creating "dead zones" for marine life near the rigs.

A further object of the invention is to create an inexpensive method for remediating drilling muds and drilling fluids so that the drilling fluids do not need to be transferred from the rig to land for disposal, and can be safely disposed of at sea off the drilling rig.

SUMMARY OF THE INVENTION

The invention relates to a nutrient source for marine organisms comprising: drilling fluids containing organic contaminants; a solidification agent; a cell transport agent; and a cellulosic additive.

The invention also relates to a nutrient source for marine organisms made by the process comprising: mixing the particulates with organic contaminates in a high shear mixer; adding a solidification agent which expands when hydrated, and electrolytically attracts organic contaminates to its surface; adding a cellulosic additive in an amount between 1 and 50 wt. % based on the amount of the organic contaminate in the drilling fluid forming a mixture; adding a cell transport agent in an amount between 0.5 wt. % and 10 wt. % based on the amount of the organic contaminate in the drilling fluid, wherein the cell transport agent is capable of transporting large organic molecules through cell walls and neutralizing the mixture to a pH of between 7 and 8; and mix at a high shear rate until said mixture forms a fine powder.

DETAILED DESCRIPTION OF THE INVENTION

The following describes a composition for remediation of drilling process fluids, drilling completion fluids, and a method for the remediation of drilling fluids, particularly drill cuttings (both oil and water based). In addition, the invention relates to a method for disposing of the materials in an environmentally friendly manner, and a method for creating a food for marine animals using drill mud cuttings, both water based and oil based. This invention also works for drilling muds mixed with drill cuttings.

Biodegradation is a natural process in which bacteria, micro-organisms and macro-organism consume organics such as petroleum hydrocarbons, carbon-based polymers, cellulose, Rate of Penetration Improvers, lubricants, loss circulation products and other carbon based additives and reduces them to normal products and byproducts such as energy, biomass and carbon dioxide. Required for such a process is a carbon nutrient source (in this case hydrocarbons, carbon-based polymers, cellulose, chemicals, lubricants etc), oxygen, a suitable diluent environment (such as water, seawater, and soil), enzymes, minerals and an adequate supply of living bacteria, microorganisms and/or macro-organisms that are acclimated to the environment.

The invention relates to the use of an additive, which converts drill cuttings to a bio-energy source, a nutrient that includes a source of minerals (calcium, magnesium), a source of nutrients (enzyme like cell transport agent) necessary for growth of the available acclimated micro and macro-organisms. By using this additive in association with the drill cuttings, the seas near the rig will have beneficial increased numbers of microorganisms and the growth of macro-organisms and higher food chain organisms rather than "dead zones" in the seawater. The dirt, sand, clay, barite, salt, carbon dioxide and a small amount of natural biomass which does result from the use of the additive with drill mud cuttings are components which are natural, and either sink to the sea floor in smaller mounds than the current commercial process, or dissolve in the saline sea water without any significant effect on the pH of the water, or the salt content of the water.

The composition of the present invention involves: a solidification agent; a cell transport agent; a cellulosic additive, wherein enough solidification agent is present to electrically attract the drilling fluid hydrocarbons to the surface of the solidification agent as it expands at least 10 time its original size.

The solidification agent is preferably a charged powdered absorption agent mixed with the drilling fluids and drill cuttings. This solidification agent renders the oil and/or organics accessible to biodegradation. Preferably, the solidification agent is added to the drill cuttings using a high shear mixer, creating an extremely fine division of particulates.

The high shear rate mixing ranges from 5 minutes to 2 hours per batch and preferably between 10 minutes and 1 hour. The mixing is performed at a temperature between 210° F. and 500° F. The mixing is a continuous mixing process that occurs at a rate between of 30–40 MT per hour.

The solidification process has been shown to increase the biodegradation of organic molecules as much as twenty fold. The composition is prepared using a shear mixer, such as a Lancaster mixer, which is employed to insure that the organic are micronized is such a way as to deposit one micro drop on each solid particle.

Typical solidification agents, which can be used, are alkaline earth oxides, such as calcium oxide, calcium peroxide, calcium hydroxide, calcium hydride, calcium borate, calcium nitrates, calcium phosphate, calcium silicates and calcium sulfates. The preferred agent are calcium oxide, Portland cement and ash products, such as Calsorb available from LA Ash in Lake Charles La. Precursers to calcium oxides may work within the scope of this invention, for example, limestone or calcium carbonate may be first used, and the heated to create adequate calcium oxides. The solidification agent can also be an alkaline earth metal hydroxide, a high lime based ash, and combinations thereof. Preferably, the solidification agent is present in amounts up to 99 wt. % of the composition.

Other solidification agents can be magnesium based, potassium or even cesium, sodium or lithium based agents. Specifically, the agent can be magnesium oxide, magnesium peroxide, magnesium hydroxide, magnesium silicate, calcium oxide, calcium peroxide, calcium hydroxide, calcium silicate, and combinations thereof.

The solidification agent is present in an amount up to 99 wt. % of the composition. Also, in a preferred embodiment, the solidification agent is hydrophobized.

A second component of this invention of the cell transport material, such as an electrolyte enzyme or similar intracellular transport agent and most preferably a non-toxic organic. These agents enhance the availability of nutrients and make them more readily absorbable. They allow minerals to regenerate and prolong the residence time of essential nutrients. They prepare minerals to react with cells. They allow minerals to inter-act with one another, breaking them down into the simplest ionic forms chelated by the electrolyte. These cell transport materials are preferably a high molecular weight, naturally occurring acid or an organometalic complexes formed with the intracellular transport agent are of a low molecular weight and molecular size, and because of this they are capable of a high degree of penetration into cells. These complexes and chelates are able to readily pass through semi-permeable membranes such as cell walls. It has also been determined that these agents not only have the ability to transport nutrients through cell membranes, they also have the ability to desensitize cell membranes and physiological functions. A well-known and important aspect of these substances is related to their absorptive interaction with organic environmental chemicals, either before or after they reach concentrations, toxic to living organisms. These agents help to form new groups of metal ions, binding them with organic pollutants such as hydrocarbons, organics, pesticides and herbicides, and catalyzing the breakdown of toxic pollutants through consumption or biodegradation.

This invention can use an oleophilic fibrous agent. This agent provides two functions; it aids the chemical reactants in the adsorption of the organic contaminant into the mineral matrix and it cause the final bio-available product to be of a lower specific gravity. The consequence of the addition of this treatment is to make the drill cuttings lighter and more readily available to organisms in the aquatic environment. The addition allows the converted cuttings of this invention to float (settle more slowly) in the ocean making it available to a variety of organisms increasing its bioavailability and therefore increasing its rate of biodegradation.

The present invention concerns a chemical and mechanical process for converting oil mud cuttings (preferably synthetic oil and water based) into form that is consumable by both micro and macro organisms. Synthetic and water based cuttings are preferred because they currently have an acceptable toxicity and biodegradability rating. The process embodied by this invention increase the bioavailability and the biodegradability of the converted hydrocarbon or organic by as much 2000 percent. Therefore, theoretically a system with biodegradability factor of 80% in 28 days could be improved to 1 to 3 days. It is commonly assumed that if carbon-bearing material exits the environment within 3 to 7 days then it has been consumed and the carbon utilized as bio fuel.

The preferred material according to this invention is a mixture an alkali metal oxide, most preferably lime (preferably hydrophobized lime) a ground adsorbent cellulosic material (preferably Kenaf core powder) and a cell transport support agent such as Fulvic acid or humic acid. Once treated, the organic pollutants present on the cuttings become readily biodegradable and further provide energy and nutrients that stimulates a very rapid growth of naturally occurring microorganisms, phytoplankton and plankton. The cellulosic additive is *hibiscus cannabinus*, most preferably Kenaf power. The cellulosic additive is used in amounts up to 50 wt. % of the composition. Preferably the cellulosic additive is a member the group: ground wood, ground corn, ground wheat, ground cotton, ground rice, ground hemp, ground sugar cane, ground nut shells, ground carboxy methyl cellulose, pulverized recycled paper, ground *hibiscus cannabinus*, and combinations thereof.

The cell transport agent (CTA) is a non-toxic organic acid. Preferably, the CTA is a high molecular weight, naturally occurring acid. The CTA can be a member of the group, humic acid, fulvic acid, citric acid, fulvates, citrates, humates, lignins and combinations thereof. Alternatively, the CTA can be an allomelanian derived acid. Allomelanian are macromolecules having polymeric phenolic structures derived from humus, including soils, coals, and peat, that result from the decomposition of organic matter and that ordinarily chelate metals, particularly iron. Also, the CTA can be a member of the group comprising: lactic acid, citric acid and combinations thereof. Finally, the CTA can be a member of the group comprising: lactic acid, citric acid, humic acid, fulvic acid, acetic acid, phosphoric acid, sulfuric acid, carbonic acid, nitric acid, and combinations thereof.

This invention, by the addition of the prescribed non-hazardous chemical treatments in the prescribed manner, convert the entire mass of drill cuttings to a food source (the hydrocarbons, carbon-based polymers, cellulose etc), a source of minerals (calcium, magnesium), a source of nutrients (enzyme like cell transport agent) necessary for growth of the available acclimated micro and macro organisms. The products of this process are increased numbers of microorganisms and the growth of macro-organisms and higher end food chain organisms. The byproducts of this process are dirt, sand, clay, barite, salt, carbon dioxide and a small amount of natural biomass.

This process eliminates the organic contamination both known and unknown that occurs in the drilling process and the "mounding" effect characteristic of the all offshore drilling.

The drill cuttings treated under the embodied process, preferably those generated from the use of synthetic oil based drilling fluid and all water based fluids, are converted into a fine silt like solid which is carried away from the drilling rig by the ocean current and very slowly descends. As the material very slowly descends the finely dispersed and micronized organic contaminants, which have been combined with a cell transport and a mineral carbonate are consumed by all available micro and macro organisms natural to the sea environment at the given location.

As the entirety of the treated material is consumed the byproducts of this process are dirt, sand, clay, barite, salt, carbon dioxide and a small amount of biomass, which are natural excrement's of all sea life. This process should take place within 1 to 7 days of initial exit from the rig.

The preferred cellulosic additive is Kenaf powder due to preferential oleophilic absorbency. However, any fiber from the (*Hibiscus cannabinus L.*, Malvaceae) family could be suitable. Also, wood, cotton, recycled paper, and other fibers and cellulosic materials may have application.

The invention relates to a nutrient source for marine organisms made by the process comprising: mixing the particulates with organic contaminates in a high shear mixer; adding a solidification agent which expands when hydrated and electrolytically attracts organic contaminates to its surface; adding a cellulosic additive in an amount between 1 and 50 wt % based on the amount of said organic contaminate in the drilling fluid forming a mixture; adding a cell transport agent in an amount between 0.5 wt. % and 10 wt. % based on the amount of said organic contaminate in the drilling fluid, wherein said cell transport agent is capable of transporting large organic molecules through cell walls and neutralizing said mixture to a pH of between 7 and 8; and mix at a high shear rate until said mixture forms a fine powder.

What is claimed is:

1. A flowing powdered nutrient source for marine organisms comprising:
   a. oil and gas drilling fluid cuttings containing organic contaminants;
   b. a powdered free-flowing solidification agent adapted for highly charged absorption and adapted to enable the organic contaminates to adhere to the molecular surface of the powdered free-flowing solidification agent;

c. a cell transport agent for combining with the powered free-flowing solidification agent and the organic contaminate of the oil and gas drilling fluid cuttings to form a free-flowing absorptive metal citrate; and d. a cellulosic additive consisting of an oleophilic fibrous agent forming a mixture.

2. The nutrient of claim 1, wherein said cellulosic additive is a powder.

3. The nutrient of claim 1, wherein said drilling fluids are drilling process fluids and drilling completion fluids.

4. The nutrient of claim 3, wherein said drilling process fluids and drilling completion fluids are drilling muds.

5. The nutrient of claim 1, wherein said solidification agent is a member of the group consisting of alkaline earth metal oxide, alkaline earth metal hydroxide, a high lime based ash, a Portland cement, and combinations thereof.

6. The nutrient of claim 1, wherein said solidification agent is a member of the group consisting of magnesium oxide, magnesium peroxide, magnesium hydroxide, magnesium silicate, calcium oxide, calcium peroxide, calcium hydroxide, calcium silicate, and combinations thereof.

7. The nutrient of claim 1, wherein said solidification agent is a member of the group consisting of magnesium hydride, magnesium borate, magnesium nitrate, magnesium phosphate, magnesium sulfate, calcium hydride, calcium borate, calcium nitrate, calcium phosphate, calcium carbonate, calcium sulfate, and combinations thereof.

8. The nutrient of claim 1, wherein said solidification agent is a member of the group:

a. potassium oxide, potassium peroxide, potassium hydroxide, potassium hydride, potassium borate, potassium nitrate, potassium phosphate, potassium silicate, potassium sulfate;

b. cesium hydroxide, cesium carbonate, cesium sulfate;

c. sodium oxide, sodium peroxide, sodium hydroxide, sodium hydride, sodium borate, sodium nitrate, sodium phosphate, sodium silicate, sodium sulfate;

d. lithium oxide, lithium hydroxide, lithium borohydride; and combinations thereof.

9. The nutrient of claim 1, wherein the solidification agent is present in said composition in an amount up to 99 wt. % of the composition.

10. The nutrient of claim 1, wherein said solidification agent is hydrophobized.

11. The composition of claim 1, wherein the cellulosic additive is is a kenaf.

12. The nutrient of claim 1, wherein the cellulosic additive is present in said composition in an amount up to 50 wt. % of the composition.

13. The nutrient of claim 1, wherein said cellulosic additive is a member of the group: ground wood, ground corn, ground wheat, ground cotton, ground rice, ground hemp, ground sugar cane, ground nut shells, ground carboxy methyl cellulose, pulverized recycled paper, ground hibiscus cannabinus, and combinations thereof.

14. The nutrient of claim 1, wherein the cell transport agent is a non-toxic organic acid.

15. The nutrient of claim 14, wherein the non-toxic organic acid is a high molecular weight, naturally occurring acid.

16. The nutrient of claim 1, wherein said cell transport agent is a member of the group, hu mic acid, fulvic acid, citric acid, fulvates, citrates, humates, lignins and combinations thereof.

17. The nutrient of claim 1, wherein said cell transport agent is an allomelanian derived acid.

18. The nutrient of claim 1, wherein said cell transport agent is a member of the group consisting of lactic acid, citric acid and combinations thereof.

19. The composition of claim 1, wherein said cell transport agent is a member of the group consisting of lactic acid, citric acid, humic acid, fulvic acid, acetic acid, phosphoric acid, sulfuric acid, carbonic acid, nitric acid, and combinations thereof.

20. A nutrient source for marine organisms made by the process comprising:

a. mixing the particulates with organic contaminates and drilling cuttings in a high shear mixer;

b. adding a powdered free-flowing solidification agent adapted for highly charged absorption and adapted to enable the organic contaminates to adhere to the molecular surface of the powered free-flowing solidification agent and adapted to expand when hydrated and electrolytically attracts organic contaminates to its surface;

c. adding a cellulosic additive comprising an oleophilic fibrous agent in an amount between 1 and 50 wt % based on the amount of said organic contaminate in a drilling fluid forming a mixture of free-flowing absorptive metal citrate;

d. adding a cell transport agent for combining with the powered free-flowing solidification agent and the organic contaminates of the oil and gas drilling fluid cuttings in an amount between 0.5 wt. % and 10 wt. % based on the amount of said organic contaminate in the drilling fluid, wherein said cell transport agent is capable of transporting large organic molecules through cell walls and neutralizing said mixture to a pH of between 7 and 8; and e. mix at a high shear rate until said mixture forms a fine powder.

21. The nutrient source of claim 20, wherein said high shear rate mixing ranges from 5 minutes to 2 hours per batch.

22. The nutrient source of claim 21, wherein said high shear rate mixing is performed from between 10 minutes and 1 hour.

23. The nutrient source of claim 20, wherein said mixing is performed at a temperature between 210° F. and 500° F.

24. The nutrient source of claim 20, wherein said mixing is a continuous mixing process that occurs at a rate between 30–40 MT per hour.

* * * * *